US007921262B1

(12) United States Patent (10) Patent No.: US 7,921,262 B1
Dash et al. (45) Date of Patent: Apr. 5, 2011

(54) SYSTEM AND METHOD FOR DYNAMIC STORAGE DEVICE EXPANSION SUPPORT IN A STORAGE VIRTUALIZATION ENVIRONMENT

(75) Inventors: Prasanta Dash, San Jose, CA (US); Michael Wahl, Georgetown, TX (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

(21) Appl. No.: 10/740,302

(22) Filed: Dec. 18, 2003

(51) Int. Cl.
*G06F 12/00* (2006.01)
(52) U.S. Cl. ............ 711/154; 711/6; 711/202; 711/203; 711/206; 711/207
(58) Field of Classification Search .................. 711/154, 711/202, 203, 206, 207, 6
See application file for complete search history.

(56) References Cited

U.S. PATENT DOCUMENTS

| | | | | |
|---|---|---|---|---|
| 5,404,478 A * | 4/1995 | Arai et al. | ...... | 711/206 |
| 6,161,191 A | 12/2000 | Slaughter et al. | ...... | 714/4 |
| 6,223,269 B1 | 4/2001 | Blumenau | ...... | 711/202 |
| 6,587,915 B1 | 7/2003 | Kim | ...... | 711/103 |
| 6,640,278 B1 | 10/2003 | Nolan et al. | ...... | 711/6 |
| 6,654,830 B1 | 11/2003 | Taylor et al. | ...... | 710/74 |
| 2002/0029319 A1 | 3/2002 | Robbins et al. | ...... | 711/114 |
| 2002/0103889 A1 | 8/2002 | Markson et al. | ...... | 709/223 |
| 2002/0196744 A1 | 12/2002 | O'Connor | ...... | 370/254 |
| 2003/0115412 A1 * | 6/2003 | Franklin et al. | ...... | 711/114 |
| 2003/0140193 A1 | 7/2003 | Acharya et al. | ...... | 711/112 |
| 2003/0163756 A1 | 8/2003 | George | ...... | 714/5 |
| 2003/0233510 A1 | 12/2003 | Umbehocker et al. | ...... | 711/100 |
| 2004/0078542 A1 * | 4/2004 | Fuller et al. | ...... | 711/172 |
| 2007/0016754 A1 * | 1/2007 | Testardi | ...... | 711/206 |

FOREIGN PATENT DOCUMENTS

| | | |
|---|---|---|
| CN | 1297196 A | 5/2001 |
| EP | 0179401 A2 | 4/1986 |
| WO | WO 99/13403 | 3/1999 |
| WO | WO 02/065309 | 8/2002 |

OTHER PUBLICATIONS

"System Management Guide: Operating System and Devices," AIX 5L Version 5.2, © IBM Corporation 1997 & 2003, Chapter 3, *Physical and Logical Volume Storage Management Tasks*, pp. 45-80.
"Hitachi Freedom Storage™ Lightning 9900™ V Series Lun Expansion and Virtual LVI/LUN User's Guide," *Preliminary Release*, © 2002 Hitachi Data Systems Corporation, pp. 1-52.

* cited by examiner

*Primary Examiner* — Tuan V Thai
*Assistant Examiner* — Midys Rojas
(74) *Attorney, Agent, or Firm* — Campbell Stephenson LLP (57) ABSTRACT

It has been discovered that systems, methods, apparatus and software can accommodate the addition or removal of available physical storage (storage "expansion") in a storage virtualization environment while virtual storage devices remain online and generally available to users. When a change to the available storage has occurred, new storage device geometry and configuration information reflecting the change is obtained and/or calculated. This new information is used to update mapping information used by virtualization software and/or to update information used by an operating system to manage storage devices. Such updating occurs while some or all of the virtual storage devices associated with the physical storage devices remain available to users. In some cases, I/O operations targeting a physical device are held, in a manner transparent to a user, while updating occurs.

39 Claims, 6 Drawing Sheets

SYSTEM AND METHOD FOR DYNAMIC STORAGE DEVICE EXPANSION SUPPORT IN A STORAGE VIRTUALIZATION ENVIRONMENT

FIELD OF THE INVENTION

The present invention relates to storage devices in distributed computer systems and, more particularly, to accommodating expandable storage devices in a storage virtualization environment.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. Such distributed computing systems typically utilize one or more storage devices in support of the computing systems operations. These storage devices can be quite numerous and/or heterogeneous. In an effort to aggregate such storage devices and to make such storage devices more manageable and flexible, storage virtualization techniques are often used. Storage virtualization techniques establish relationships between physical storage devices, e.g. disk drives, tape drives, optical drives, etc., and virtual or logical storage devices such as volumes, virtual disks, and virtual logical units (sometimes referred to as virtual LUNs). In so doing, virtualization techniques provide system-wide features, e.g., naming, sizing, and management, better suited to the entire computing system than those features dictated by the physical characteristics of storage devices.

Figure 1:
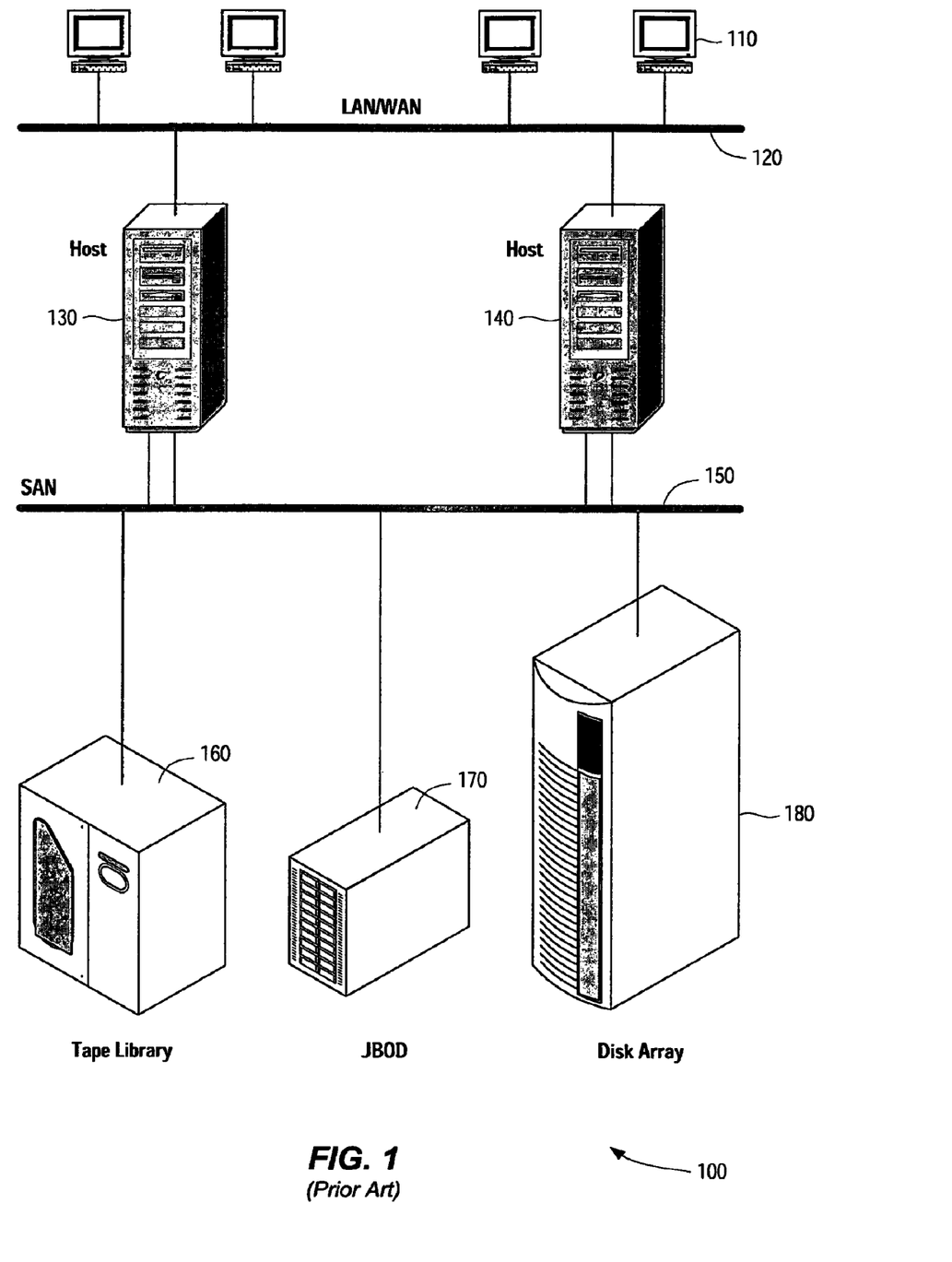
FIG. 1 is a simplified block diagram of a computing system.
Figure 7:
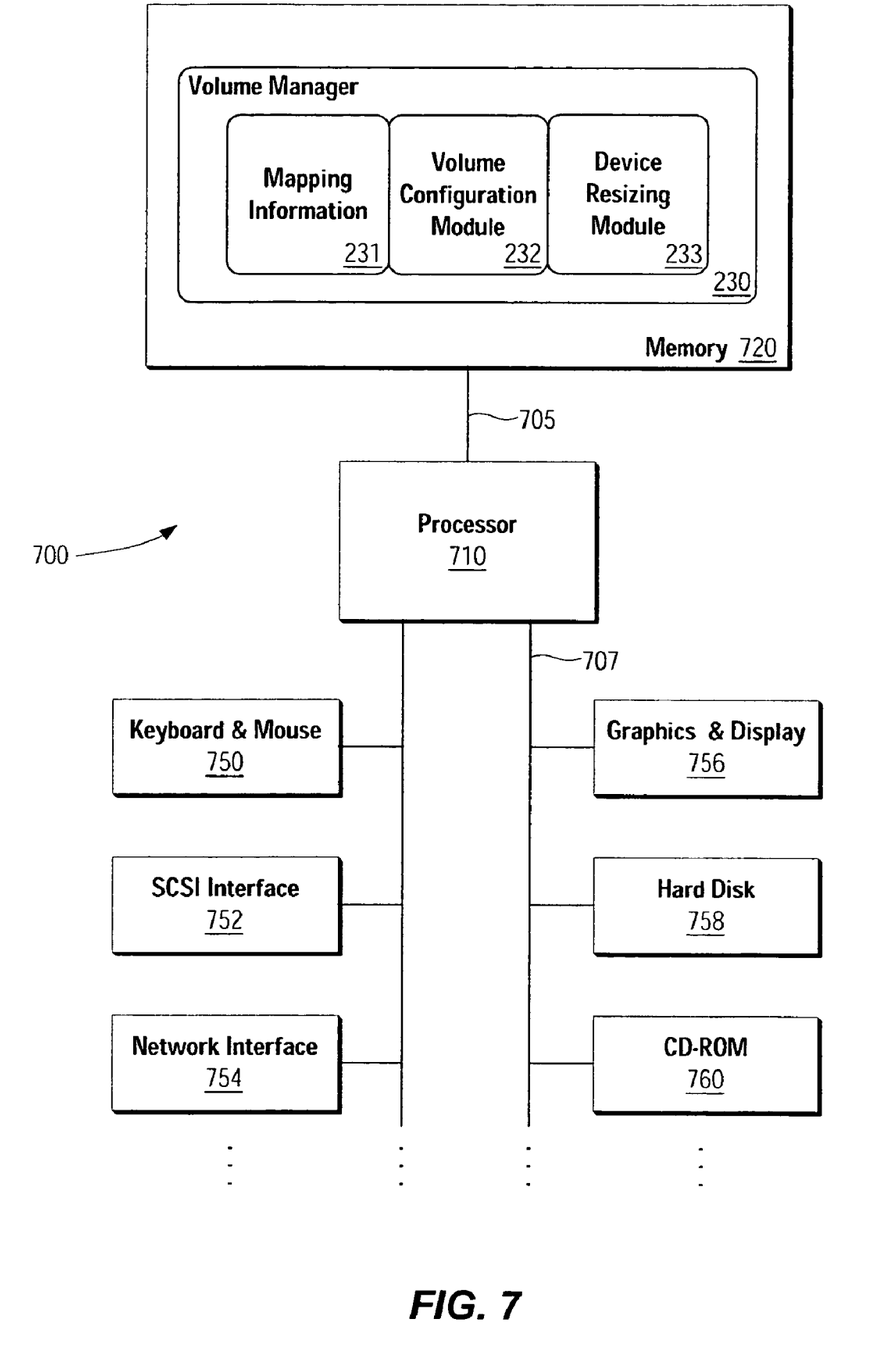
FIG. 7 is a block diagram of a computer system for implementing the techniques of the present invention.

FIG. 1 illustrates a simplified example of a computing system 100. The members of the computing system 100 include host 130 and host 140. As members of computing system 100, hosts 130 and 140, typically some type of application, data, or file server, are often referred to "nodes." Hosts 130 and 140 can be designed to operate completely independently of each other, or may interoperate to form some manner of cluster. Thus, hosts 130 and 140 are typically individual computer systems having some or all of the software and hardware components well known to those having skill in the art. FIG. 7 (described below) illustrates some of the features common to such computer systems. In support of various applications and operations, hosts 130 and 140 can exchange data over, for example, network 120, typically a local area network (LAN), e.g., an enterprise-wide intranet, or a wide area network (WAN) such as the Internet. Additionally, network 120 provides a communication path for various client computer systems 110 to communicate with hosts 130 and 140. In addition to network 120, hosts 130 and 140 can communicate with each other over a private network (not shown).

Other elements of computing system 100 include storage area network (SAN) 150 and storage devices such as tape library 160 (typically including one or more tape drives), a group of disk drives 170 (i.e., "just a bunch of disks" or "JBOD"), and intelligent storage array 180. As shown in FIG. 1, both hosts 130 and 140 are coupled to SAN 150. SAN 150 is conventionally a high-speed network that allows the establishment of direct connections between storage devices 160, 170, and 180 and hosts 130 and 140. SAN 150 can be implemented using a variety of different technologies including SCSI, fibre channel arbitrated loop (FCAL), fibre channel switched fabric, IP networks (e.g., iSCSI), Infiniband, etc. SAN 150 can also include one or more SAN specific devices such as SAN switches, SAN routers, SAN hubs, or some type of storage appliance. Thus, SAN 150 is shared between the hosts and allows for the sharing of storage devices between the hosts to provide greater availability and reliability of storage. Although hosts 130 and 140 are shown connected to storage devices 160, 170, and 180 through SAN 150, this need not be the case. Shared resources can be directly connected to some or all of the hosts in the computing system, and computing system 100 need not include a SAN. Alternatively, hosts 130 and 140 can be connected to multiple SANs.

Storage virtualization software operating on, for example, hosts 130 and 140 manages the storage devices available to and recognized by the native operating systems on the hosts and provides virtual storage devices for use by application software, file system software, and even the operating systems themselves. In addition to reliability, availability, manageability, etc, storage virtualization software typically allows the size of virtual storage devices to increase or decrease while the virtual storage devices are online, e.g., available for use by applications, file systems, and the like. Typically, the storage devices managed by the storage virtualization software, such as disk drives, tape devices, and solid state storage devices, are fixed in size and geometry. The task of making such devices available for use by the storage virtualization software, a process often referred to as initializing, can include: organizing the storage device into one or more regions for use by the storage virtualization software; organizing the storage device into one or more regions for general use, e.g., use by application software, data storage, etc.; and recording information about both the storage device and information used to establish and manage corresponding virtual storage devices.

In general, once a storage device has been initialized and is in use by storage virtualization software, i.e., the storage device is online, the storage device cannot be reinitialized or reconfigured without removing the storage device from availability to the storage virtualization process and threatening the integrity of data present on the storage device. For example, a typical reinitialization process might include: backing up the data on the storage device, removing the storage device from service, reinitializing the storage device, and restoring the data to the storage device. Although this can be an error prone and time consuming process, it may be a rare occurrence when the storage device in question is a typical disk drive because a disk drive's size and geometry remain fixed.

However, when the storage device in use by the storage virtualization software is not a physical disk drive, but is instead a virtual device such as a virtual logical unit (sometimes referred to as a LUN) on an intelligent disk array, SAN switch, or RAID controller, it is possible that the size of the storage device can change dynamically. Storage devices that can increase or decrease in size, whether by the addition/removal of storage or by the addition/removal of access to existing storage, can be referred to as expandable storage devices. Thus, expandable storage devices include storage devices that can both increase and decrease in available storage capacity.

In order to make use of newly available storage from an expandable storage device, or to accommodate a loss of storage in an expandable storage device, storage virtualization software will typically have to reinitialize some or all of the storage. As noted above, that process can be time consuming and a threat to data integrity when there is data that should be preserved on the expandable storage device.

Accordingly, it is desirable to have efficient and convenient mechanisms whereby storage virtualization software can accommodate changes in the amount of available storage, e.g., storage resizing, from expandable storage devices. Moreover, it is desirable that these efficient and convenient mechanisms generally allow the expandable storage devices to remain in operation and online while any storage virtualization software related configuration changes are performed.

SUMMARY OF THE INVENTION

It has been discovered that systems, methods, apparatus and software can accommodate the addition or removal of available physical storage (storage "expansion") in a storage virtualization environment while virtual storage devices remain online and generally available to users. When a change to the available storage has occurred, new storage device geometry and configuration information reflecting the change is obtained and/or calculated. This new information is used to update mapping information used by virtualization software and/or to update information used by an operating system to manage storage devices. Such updating occurs while some or all of the virtual storage devices associated with the physical storage devices remain available to users. In some cases, I/O operations targeting a physical device are held, in a manner transparent to a user, while updating occurs.

Accordingly, one aspect of the present invention provides a method. Information describing storage expansion in an expandable storage device is received. Changes to be made to information for converting input/output (I/O) operations directed at a virtual storage device to I/O operations directed at the expandable storage device are determined. The determining uses the information describing storage expansion in an expandable storage device. The changes to be made to the information for converting I/O operations directed at a virtual storage device to I/O operations directed at the expandable storage device are applied.

In another aspect of the present invention, a system includes a virtual storage device manager, and an online storage device resize module. The virtual storage device manager is configured to map input/output (I/O) operations targeting a virtual storage device to I/O operations targeting an expandable storage device. The virtual storage device manager includes storage device mapping information. The online storage device resize module is in communication with the virtual storage device manager. The online storage device resize module is configured to: receive information describing storage expansion in the expandable storage device; determine changes to be made to the storage device mapping information using the information describing storage expansion in the expandable storage device; and update the storage device mapping information while the expandable storage device is online.

In another aspect of the present invention, a computer readable medium includes program instructions executable on a processor. The computer readable medium is at least one of an electronic storage medium, a magnetic storage medium, an optical storage medium, and a communications medium conveying signals encoding the instructions. The program instructions are operable to implement each of: receiving information describing storage expansion in an expandable storage device; determining changes to be made to information for converting input/output (I/O) operations directed at a virtual storage device to I/O operations directed at the expandable storage device, wherein the determining uses the information describing storage expansion in an expandable storage device; and applying the changes to be made to the information for converting I/O operations directed at a virtual storage device to I/O operations directed at the expandable storage device.

Yet another aspect of the present invention provides an apparatus including: a means for receiving information describing storage expansion in an expandable storage device; a means for determining changes to be made to information for converting input/output (I/O) operations directed at a virtual storage device to I/O operations directed at the expandable storage device, wherein the determining uses the information describing storage expansion in an expandable storage device; a means for preventing at least one I/O operation from being directed to the expandable storage device; a means for applying the changes to be made to the information for converting I/O operations directed at a virtual storage device to I/O operations directed at the expandable storage device; and a means for allowing the at least one I/O operation to be directed to the expandable storage device.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 2:
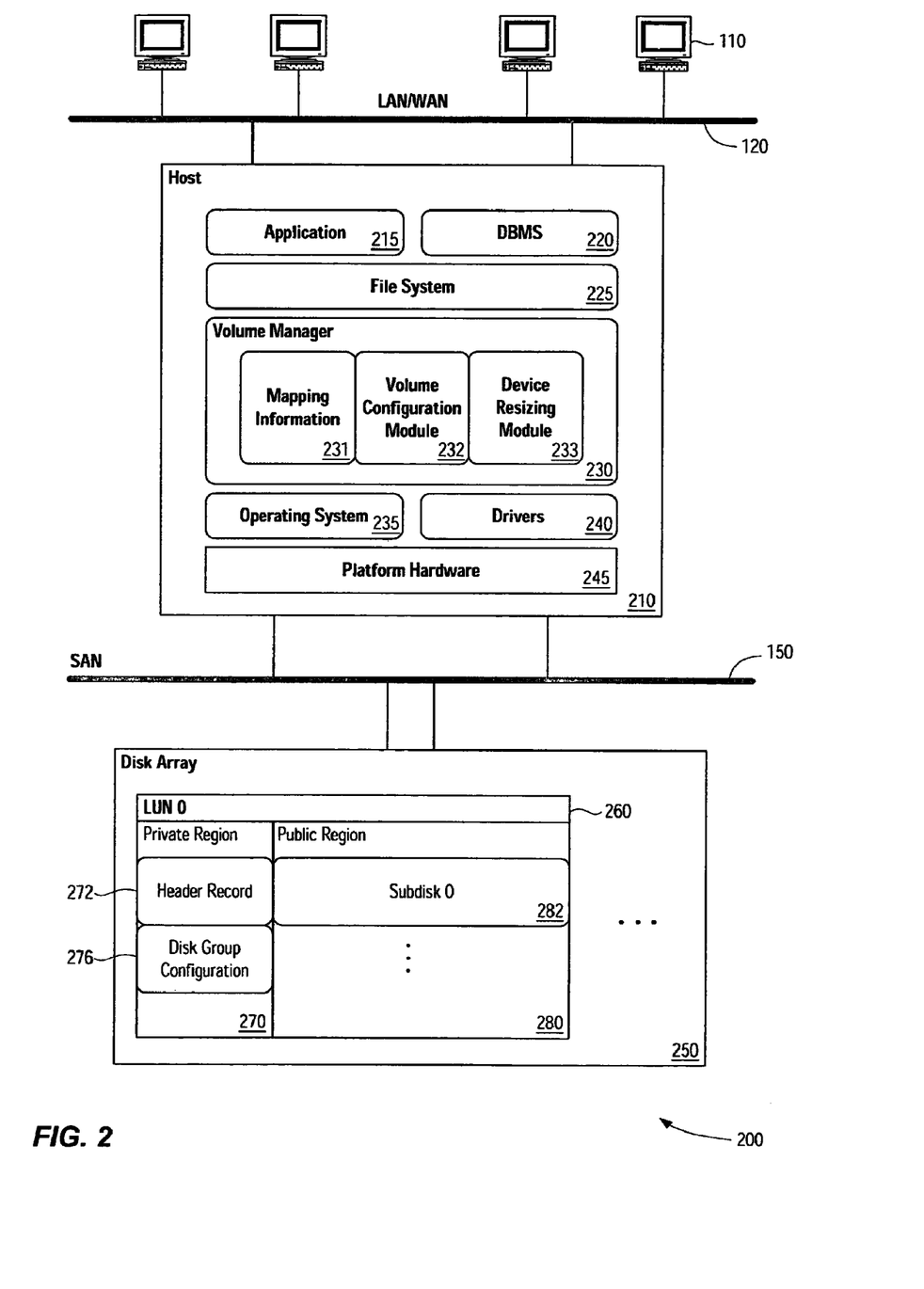
FIG. 2 is a simplified block diagram of portions of a computing system including a host computer system utilizing some of the systems and methods of the present invention.

FIG. 2 illustrates a simplified block diagram of computing system 200 utilizing some of the systems and methods of the present invention. In the example of FIG. 2, computing system 200 includes host 210 and disk array 250. Host 210 executes one or more application programs such as application 215 and database management system (DBMS) 220. Such applications can include, but are not limited to, DBMS's, file servers, application servers, web servers, backup and restore software, customer relationship management software, and the like. Host 210 also includes file system software 225 which provides organization of and access to files and directories stored in storage devices accessible to host 210, such as disk array 250. Examples of such file system software include the VERITAS File System™ and various implementations of the UNIX file system (UFS).

Volume manager 230 is storage virtualization software that enables physical resources configured in the computing system to be managed as logical devices. An example of software that performs some or all of the functions of volume manager 230 is the VERITAS Volume Manager™ product provided by VERITAS Software Corporation. Although many of the examples described in the present application will emphasize virtualization architecture and terminology associated with the VERITAS Volume Manager™, the software and techniques described herein can be used with a variety of different storage virtualization products and architectures. Moreover, even though volume manager 230 is depicted as executing on host 210, the techniques described herein can be used in a variety of architectures including those where the volume manger is executed, either fully or partially, by a component in SAN 150 (e.g., a switch) or in a storage device (e.g., disk array 250) itself. Volume manager 230 provides a storage management subsystem that allows for the management of physical disks as logical devices called volumes. Moreover, use of the term volume in this context is well known to those having ordinary skill in the art, but other terms for virtual or logical storage devices and the objects or sub-devices from which they are organized will also be known to those having skill in the art. Thus, a volume is a logical or virtual device that appears to data management systems such as application 215, DBMS 220, and file system 225 as a physical disk or disk partition device.

Volume manager 230 typically operates as a subsystem between the host operating system 235 and the data management systems, such as application 215, DBMS 220, and file system 225. Volume manager 230 can be tightly coupled with operating system 235. For example, before a storage device such as disk array 250 can be brought under volume manager control, the storage device must typically be accessible through the operating system's device interface. Thus, volume manager 230 is typically layered on top of operating system 235 interface services, and is dependent upon how operating system 235 accesses physical storage devices. Application 215, DBMS 220, file system 225, and applications executing on client computer systems 110 can initiate or request I/O operations against storage devices such as disk array 250. These I/O operations typically include read and write operations to logical or virtual devices such as volumes, virtual LUNs, and/or virtual disks designed to appear and operate as SCSI LUNs. Volume manager 230 enables the execution of these I/O operations by, for example, passing them on to device drivers 240, which in turn use platform hardware 245, e.g., a host bus adapter, to present the commands to the appropriate storage device.

Volume manager 230 is typically formed from one or more components or modules such as kernel modules, software utilities, daemons, etc. As shown in FIG. 2, volume manage 230 includes mapping information 231, volume configuration module 232, and device resizing module 233. Mapping information 231 typically includes information about the organization of virtual storage devices and/or their underlying objects as well as information about the relationship between the virtual storage devices and corresponding physical storage devices. Thus, mapping information 231 includes some or all of the information needed by volume manager 230 to direct an I/O operation targeting a virtual storage device to the corresponding physical storage device. Volume configuration module 232, often implemented as a constantly running process (e.g., a daemon) which maintains storage virtualization configurations, communicates configuration changes to the kernel, and modifies configuration information stored on storage devices. Device resizing module 233, which can be implemented as part of volume configuration module 232, is responsible for accommodating the dynamic expansion of a storage device so that volume manager 230 and any of the devices or software entities using volume manager 230 (e.g., clients of volume manager 230) can make use of the storage made available by expansion of the storage device. In order to reduce the impact on storage device availability and reduce or eliminate the need to move data residing on an expanded storage device, device resizing module 233 is designed to operate while keeping the expanded storage device online. Detailed operation of device resizing module 233 is described below.

Again, it should be noted that volume manager 230 can be comprised of a variety of separate software components including: user space applications and utilities, kernel modules, device drivers, command line interfaces (CLIs), graphical user interfaces (GUIs), daemons, and the like. The particular arrangement of software components of FIG. 2 is merely illustrative, and does not show a variety of components that will be well known to those having skill in the art.

Disk array 250 is an example of an expandable storage device and is coupled to host 210 via the aforementioned SAN 150. Although FIG. 2 illustrates a SAN implementation, host 210 and disk array 250 need not be coupled via SAN 150. For example, disk array 250 can be attached to host 210 via a local area network (such as an Ethernet network) or may be directly connected to host 210 using conventional I/O protocol interfaces such as SCSI or IDE interfaces. In the implementations described herein, disk arrays and particularly intelligent disk arrays will be used as examples of expandable storage devices. A variety of different storage devices can be used as expandable storage devices in conjunction with the programs and techniques described herein. Examples of such devices include: single path and multipath disk arrays, discrete disks, JBODs, optical devices, tape drives, solid state storage devices (including flash memory), storage appliances, and other storage devices.

As an intelligent disk array, disk array 250 typically includes its own processor, operating system, memory, and internal I/O channels connecting the processor to internal disks (not shown). The processor controls internal I/O and external ports connected to host computer systems such as host 210. I/O operation requests received by an intelligent disk array are translated into I/O operations executed against one or more disks internal to the disk array. Consequently, intelligent disk arrays are presented to host computer systems as one or more virtual LUNs, and/or virtual disks designed to appear and operate as LUNs. Host 210 and in particular volume manager 230 thus treat disk array 250 as if it were one or more addressable LUNs despite the fact that each LUN might be formed from a number of different physical storage devices. Part of the value of some intelligent disk arrays is that they have the capability to add or replace individual disks while keeping the array online.

Disk array 250 is shown to include at least one LUN (LUN 0) 260 as seen by host 210. Once configured by an administrator, additional storage made available on disk array 250 can have the effect of increasing the size of a particular LUN, or increasing the number of LUNs. Similarly, removing one or more disk drives from disk array 250 will have the effect of reducing the size of one or more LUNs. Although intelligent disk arrays are designed to handle such configuration changes internally, virtualization software external to the disk array, e.g., volume manage 230, must also accommodate the apparent LUN changes which are typically manifested as changes in LUN size and or geometry.

As shown, LUN 260 has been initialized by volume manager for its own use and includes a variety of virtualization management information. In the examples, described, volume manager 230 creates a number of virtual objects related in some way to a portion (or the all of) LUN 260 and uses those objects to form one or more volumes that serve as the virtual storage devices made available by the volume manager. When a physical disk, a slice/partition of a physical disk, or a device that appears as a physical disk (such as LUN 0) is placed under volume manager 230's control, a virtual object known as a volume manager (VM) disk is assigned to the physical disk or LUN. Since a physical disk or a device that appears as a physical disk is the basic storage device seen by volume manager 230, such devices are typically accessed using a device name (sometimes referred to as a disk access name). The format of such device names typically vary with the computer system in use, but generally include one or more parameters such as: an identifier for the controller associated with the device, a target identification (e.g., SCSI target ID), a LUN, and/or a partition or slice number on the LUN. In this way, the device can be uniquely identified and addressed. Each VM disk is also typically given a unique disk media name (a virtual disk name) for use by the volume manager. Thus, a particular VM disk can usually be identified by one or both of a "device name" (disk access name) and a "disk name" (disk media name). In the present example, LUN 260 corresponds to a particular VM disk having both a device name and a VM disk name (not shown).

A collection of one or more VM disks can be called a disk group. Disk groups typically share a common configuration which includes a set of records with detailed information about related virtualization objects, their attributes, and their connections. Moreover, volume manager 230 allocates storage from a contiguous area of the VM disk space. As illustrated, a VM disk typically includes a public region 280 used for allocated storage and a private region 270 where internal configuration information is stored.

Private region 270 is usually a small area of storage where configuration information is stored. Examples of the stored configuration information include: Disk Header Record (272): This record defines the unique disk ID, disk geometry information, and disk group association information. Disk Group Configuration (276): A disk group's persistent configuration records describe how the public region is organized and used by the volume manager, e.g., subdisks and the arrangement of subdisks into volumes. Disk group configuration records are preferably redundant and distributed among different disks for failure recovery.

Public region 280 is the area that covers the remainder of the VM disk and is used as allocated storage space. This space is typically further organized into one or more regions or units known as subdisks (282). A subdisk is a set of contiguous disk blocks where a block (sometimes a sector) is the basic unit of space on the disk. Volume manager 230 allocates disk space using subdisks, and a VM disk can typically be divided into one or more subdisks. Each subdisk represents a specific portion of a VM disk, which is mapped to a specific region of a physical disk, or in the case illustrated, a specific region of the LUN 0 virtual device presented by disk array 250. In general, a VM disk can contain multiple subdisks, but subdisks do not overlap or share the same portions of a VM disk. Volume manager 230 uses subdisks to build other virtual objects called plexes. A plex comprises one or more subdisks located on one or more physical disks. A volume in turn comprises one or more plexes, each holding a copy of the selected data in the volume. Due to its virtual nature, a volume is not restricted to a particular VM disk or a specific area of a VM disk. The configuration of a volume can be changed by using volume manager interfaces, and configuration changes can generally be accomplished without causing disruption to applications or file systems that are using the volume.

The arrangement of private region 270 and public region 280 is only one example of a variety of different formats that can be applied to VM disks. Another possible format is the so-called sliced format where the public and private regions are on different disk partitions or slices. Still another possible format is a no private format where there is no private region but only a public region for allocating subdisks.

In addition to storing virtualization information and virtualization object organization, volume manage 230 may also have to process and/or modify information stored by the operating system or systems in use by host 210. For example, the first block or blocks of a disk typically include partitioning information. Disk partitions (or slices) are treated as independent logical storage devices and usually given their own device names as described above. In the simplest case, the partition information is simply a table describing one or more of: partition names or numbers, the starting block (offset) of a given partition, the ending block of a given partition, the length of a given partition. This partition information is typically part of a master boot record (MBR) or volume table of contents (VTOC) that may also provide detailed disk geometry information (e.g., the number of bytes per sector/block; the number of sectors per disk track; the number of sectors per disk cylinder; the number of cylinders, the number of accessible cylinders) and boot information such as actual boot code and the location of the OS partition on the disk.

Thus, when the available storage in an expandable storage device changes, some or all of the aforementioned information may need to be changed. Device resizing module 233 performs the needed calculations and information update to make any change in storage from the expandable storage device available and to do so in a manner that does not require the corresponding volumes to be taken out of service, i.e., device resizing module 233 accommodates storage device expansion in a seamless online fashion. It should be noted that the aforementioned examples of stored configuration information and storage organization are merely illustrative, and one having ordinary skill in the art will readily recognize that a variety of different types of information and different information organization schemes can be used in connection with the described storage virtualization programs and techniques.

Figure 3:
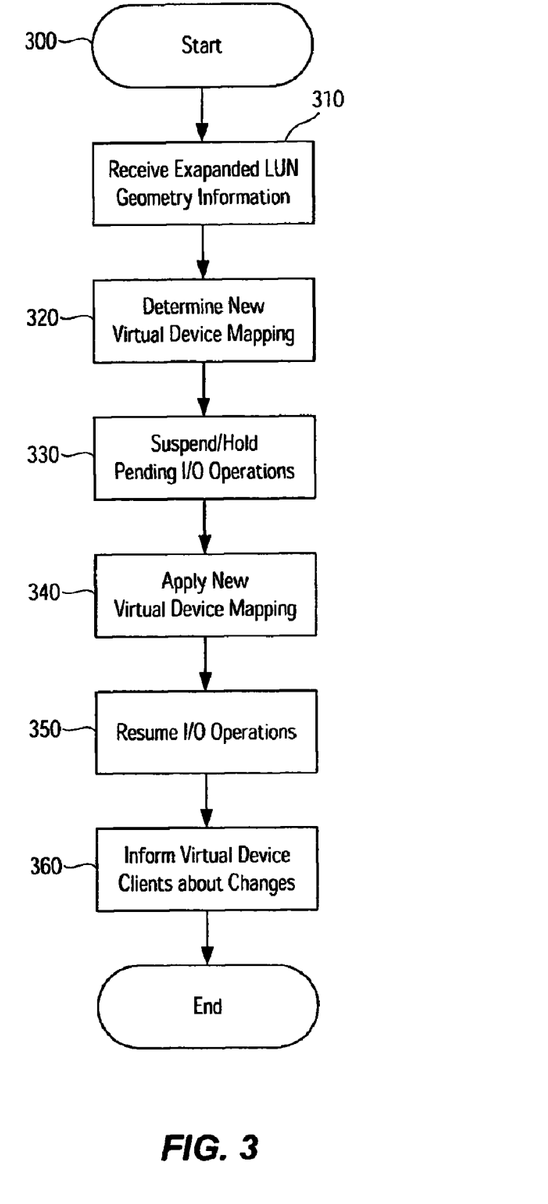
FIG. 3 is a flow chart illustrating techniques of the present invention.

Operation of the basic systems and methods for accommodating changes in the available storage of an expandable storage device are illustrated in FIG. 3. The methods described in FIGS. 3-6 will make general reference to some of the devices, programs, and data structures illustrated in FIG. 2. However, the methods need not be restricted to use with such devices, programs, and data structures, and a variety of different devices, programs, and data structures can be used in conjunction with the disclosed techniques. Operation begins at 300, which typically occurs subsequent to whatever activity is performed on the expandable storage device to make new storage available or to reduce the available storage. For example, where the expandable storage device is an intelligent array, the array may be configured to make additional disk drives available to an existing LUN that is presented by the array. As shown in step 310, information about the new geometry or organization of the expanded storage device is received. In situations where the storage device presents one or more logical devices as if they are physical devices, e.g., LUN 260 of disk array 250, the new geometry or organization information may simply describe a new number of blocks available in a LUN or a starting offset and a length. This information is typically received in response to one or more commands issued against the expandable storage device. For example, the I/O interface between the host and the expandable storage device typically implements a standardized I/O protocol, e.g., SCSI, that includes one or more commands used to learn information about the storage device. In still another example, the expandable storage device can be configured to automatically provide or broadcast the desired information. In yet another example, some third device or software entity, e.g., a SAN switch, a driver, or a portion of the operating system can server as an intermediary for supplying the needed configuration information.

Based on the information received at 310, new virtual device to physical device mapping is determined in step 320. This process can also include the use of geometry and configuration information about the expandable storage device prior to any change in the amount of available storage. For example, if the amount of available storage has increased, the public region of a VM disk that was previously associated with blocks 50 through 40000, may now have to be associated with blocks 50 through 100000 to account for the expansion of the expandable storage device. If instead the device alignment or partitioning has changed, offset information relative to a changed partition or slice boundary may need to change even though the overall length of a subdisk has not changed. As will be seen below in conjunction with FIGS. 4-6, more complicated calculations and determinations may be needed to make the additional storage available to one or virtual storage devices.

Before the virtual device mapping can be updated, some mechanism is used to suspend, hold, and/or finish I/O operations (330). This step is implemented in order to prevent erroneous I/O operations while still allowing clients of the volume manager to direct I/O operations to the volume manager and thereby not interrupt their normal operation. Online accommodation of the storage change (referred to below as a VM disk resize operation) is performed so that data on the storage device will remain accessible for applications though there might be small intervals where I/O is quiesced and held up while changing configuration. For example, once the new mapping is determined, pending I/O operations will be allowed to complete and new I/O operations will be queued. Once all the pending I/O operations are completed, the new virtual storage device mapping is applied as shown in 340. To accomplish this task, information in mapping information 231 and/or LUN 260 may be updated. Changes to virtual device objects, partition maps, public regions, private regions, etc., may take place as part of this operation. Once the mapping information is updated, I/O operations can be resumed (350).

In the case where I/O operations have been queued by the volume manager, those operations may be given preference over newly received I/O operations. Implementation of the necessary I/O operation quiescing procedures can be based on existing volume manager locking mechanisms to prevent undesired execution of I/O operations. In circumstances where application of the changes to the virtual device mapping may take an unacceptably long time, multiple iterations of steps 330, 340, and 350 can be performed. Moreover, although the mapping changes are typically determined in advance, so as to minimize the time needed to suspend/hold I/O operations, mapping changes can be determined simultaneously with or after I/O operation suspension. If necessary, various clients of the virtual storage device, e.g., applications or the operating system, can be explicitly informed of the change (360). For example, it may be particularly useful to explicitly inform the operating system of the changes to the expandable storage device because the operating system might not otherwise learn of the changes until a reboot or other device discovery event.

Figure 4:
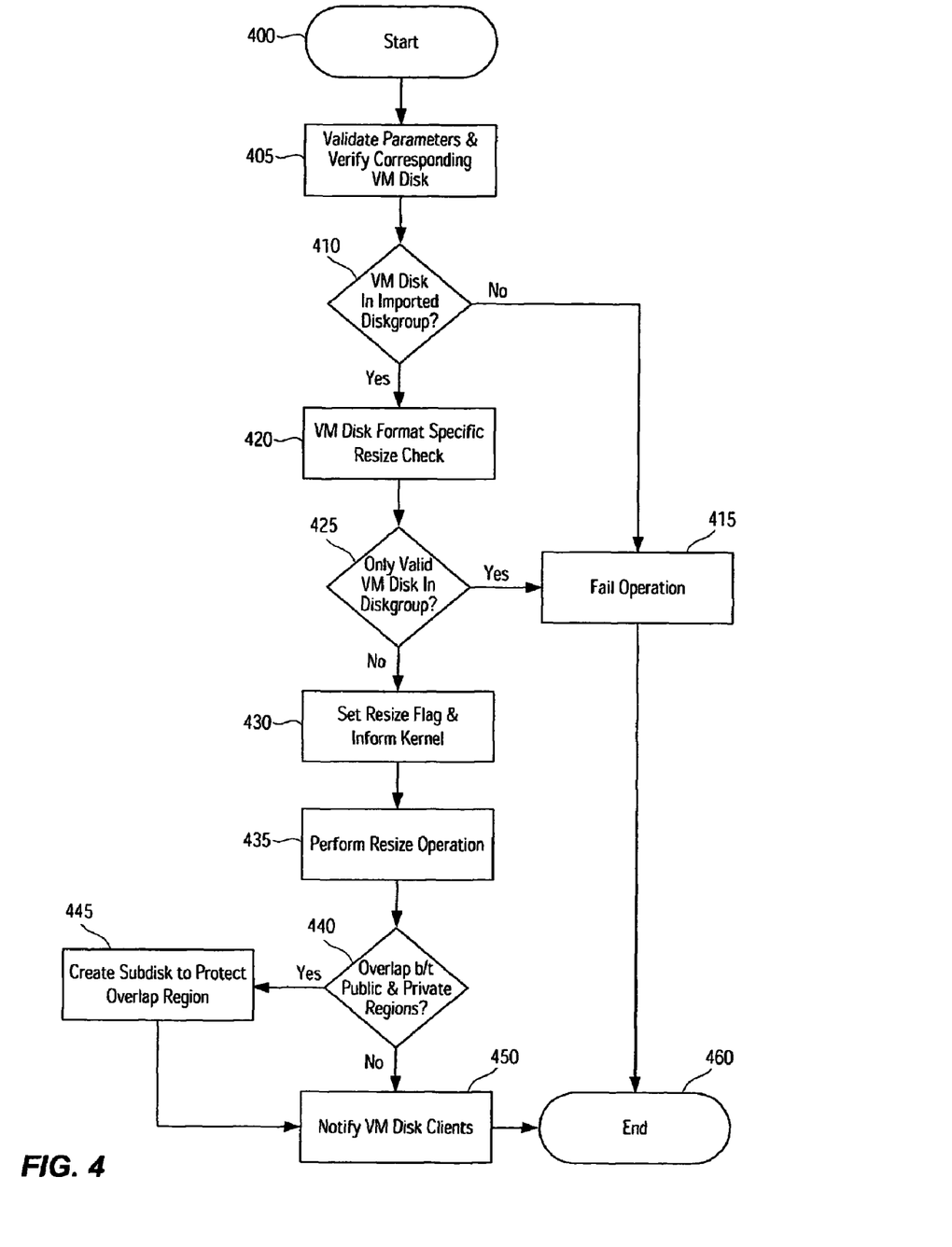
FIG. 4 is a flow chart illustrating techniques of the present invention.
Figure 5:
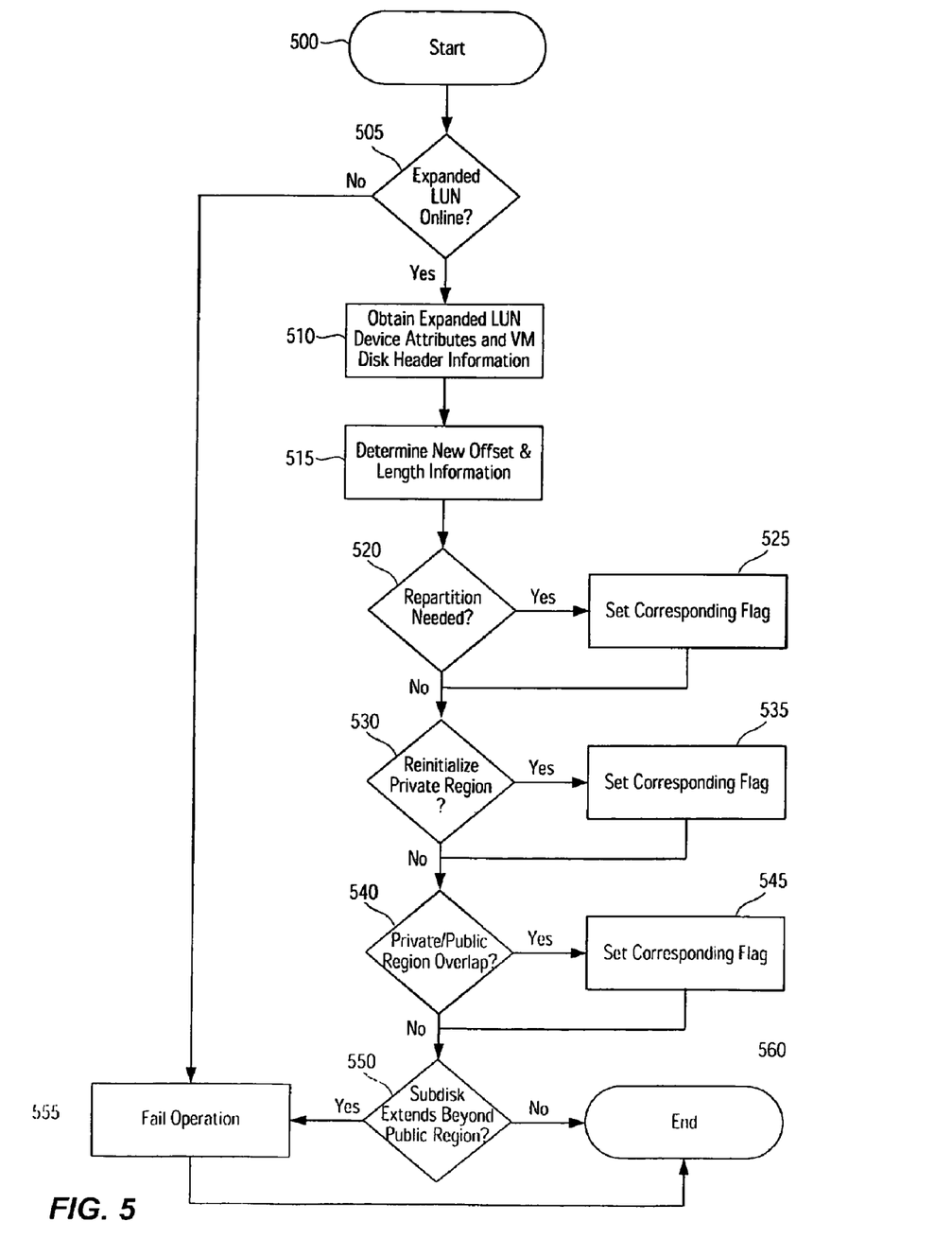
FIG. 5 is a flow chart illustrating techniques of the present invention.
Figure 6:
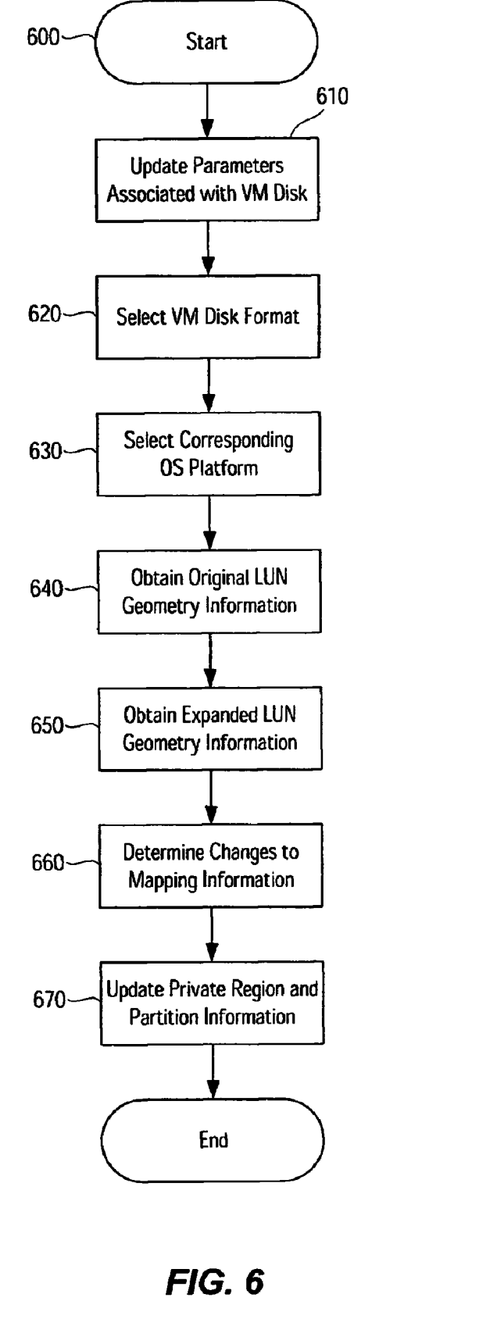
FIG. 6 is a flow chart illustrating techniques of the present invention.

FIGS. 4-6 illustrate in greater detail the process of resizing a VM disk in response to a change in the storage available on an expandable storage device such as disk array 250. More specifically, the central process begins at 400 in FIG. 4. As was the example illustrated in FIG. 3, operation of this process typically occurs subsequent to whatever activity is performed on the expandable storage device to make new storage available or to reduce the available storage. Step 400 usually includes the issuing of some command or set of commands to volume manager 230 requesting that the mapping of virtual devices associated with the expandable storage device be updated to reflect changes in the expandable storage device. Such commands can be invoked by a system administrator using a CLI or GUI, or may instead be invoked by another process or program. In a typical example, the command will specify the device name and/or the VM disk name corresponding to the device, which in this example is LUN 260. Commands may also specify the size change of the expandable storage device, e.g., a new length in blocks. Still other parameters can be accommodated as desired or is necessary.

While the commands initiating the process are typically issued by an administrator, the initiation itself can also be automated. For example, in a distributed environment more than one host computer system might detect that a LUN has expanded, but operations like repartitioning need be performed only once. Consequently, an automated task can coordinate among various hosts to ensure that certain tasks are performed only once. In still another example, the coordination is greatly simplified by specifying one host that is responsible for handling LUN expansion. Operation of the controlling host could be automatic, scheduled, and/or administrator initiated.

In 405, the parameters associated with the command are validated, and VM disk verification is performed. The validation process can include operations such as confirming that device names or VM disk name correspond to valid entities, that the device or VM disk has a valid format, and that the user is authorized to perform the resize operation. Moreover, certain data corresponding to the device or the VM disk may be loaded and/or examined in preparation for the resize operation. Under some conditions operation 405 may result in an error or failure indication (not shown). Operation then proceeds to 410 where it is determined whether the VM disk in question is imported in a disk group. In general, VM disks are made available to the volume manager by virtue of the membership in a disk group. Importing a disk group enables access by the system to the disk group. Consequently, membership in a diskgroup that is not imported means that the relevant VM disk is not accessible by the volume manager. Since the device resize module 233 and related functionality are designed to operate with devices that are in use to preserve existing data and metadata, this determination is made to ensure proper operation. Storage virtualization software typically has well established mechanisms for initializing devices that are not already available for use by the software (and for which data preservation is not an issue), and in many cases those mechanisms would be more appropriately used. However, in some embodiments, the device resizing module can be configured to operate on VM disks that are either imported or not. If, for the embodiment described in FIG. 4, it is determined that the VM disk specified, either directly or indirectly, by the command invoking the process is not part of an imported disk group, the operation fails 415 (typically with some error indication) and terminates at 460.

If instead the VM disk specified by the command invoking the process is part of an imported disk group, operation transitions to 420 where the VM disk format and perhaps platform specific information is checked for the resize operations. Because VM disks may be formatted in different ways, as described above, routines for performing the initial analysis and, if necessary, calculations may also have to be format-specific. Similarly, since the operating system being used in conjunction with the storage device may dictate certain platform specific features, e.g., type, content, and location of partition tables, platform specific check routines can also be implemented.

FIG. 5 illustrates an example of the operations performed in 420 as part of the preparation for the VM disk resize. After being invoked (500), a determination is made (505) whether the device that was expanded, in this example LUN 260, is online. This determination is typically separate from the aforementioned step 410 because a VM disk could be imported by virtue of its membership in an imported diskgroup but otherwise be unavailable (offline) because of an error condition, device failure, operation internal to the disk array, or the like. If the expanded storage device is offline, the operation fails 555 (typically with some error indication) and terminates at 560. If however the expanded storage device is online, operation transitions to 510 where a variety of information is gathered including device attributes and VM disk header information. This information is used to compute the new virtual storage device mapping information and can also be used for further validation or verification procedures. Moreover, the information from the VM disk being resized typically reflects the configuration state of the VM disk before any resizing has occurred. New offset, length, or other partition and/or configuration information are determined in 515. Such determinations can make use of the information gathered at 510 as well as information passed along or packed into data structures from earlier parts of the process such as the initial invocation to the resize operation. For example, if the storage device expansion has resulted in a change in the cylinder size of one or more of the disk drives that are used to create LUN 260, then a calculation taking into account both old and new cylinder sizes might be performed.

Depending on the size and configuration of partitions on the VM disk, a repartition operation may need to be performed. In step 520 such a determination is made by, for example, comparing the changes associated with the device expansion with a partition table for the device. If repartition is needed, operation transitions to 525 where a corresponding flag is set. In this example, a flag is set, rather than performing the repartition immediately, because all of the configuration changes are preferably performed at approximately the same time so as to minimize the period during which I/O operations directed at the expandable storage device must be suspended or held. Next in 530, a determination is made as to whether the private region of the VM disk should be reinitialized. Much as before, information gathered in previous steps is used to determine whether the completed resize operation will necessitate reinitialization of the private region. If so, and appropriate flag is set 535. If not, or after the flag is set, operation transitions to 540 where a determination is made as to whether the change in available storage from the expandable storage device will cause public and private regions to overlap. For example, changes in disk geometry (cylinder size, sector size, etc.) may dictate reorganization of the public and private regions to maintain the desired data alignment which is beneficial for system performance. Such changes can lead to public/private region overlap. If it is determined that an overlap will occur, a corresponding flag is set (545). If there is no overlap, or upon completion of 545, operation transitions to 550. In this step, the subdisk or subdisks that are defined on the VM disk are checked to see if they will be affected by the resize operation. For example, any existing subdisks should still be bound by the limits of the public region. If a subdisk would extend beyond the new public region's limits, the operation fails 555 (typically with some error indication) and terminates at 560. If not, the resize checking procedure is completed (560) and operation continues as described in FIG. 4.

Returning to FIG. 4, the VM disk in question is examined to determine whether it is the only valid VM disk in the diskgroup. If that is the case, there is a danger that an error, e.g., a system crash or a power failure, during a critical part of the resize process might damage or destroy information vital to the operation of the VM disk or diskgroup, and leave those objects in a state from which they cannot be recovered. Thus, in some implementations, the fact that the VM disk being resized is the only valid VM disk in the group or is the only VM disk possessing valid diskgroup configuration information can be used to cause the process to fail 415 (typically with some error indication) and terminate at 460. In other implementations, no such check is performed, or an option exists to allow a user to force the resize despite the fact that the VM disk fails the test of 425. Next, a resize flag is set to indicate to various processes, programs, and devices, that a resize operation is about to be performed (430) Additionally, one or more kernel modules or other volume manager modules can be called to establish the needed I/O operation locks and quiesce I/O operations. As noted above, one goal of the resize process described herein is the ability to perform resizing on a VM disk while it is still in an imported diskgroup and available to user applications. Imposing I/O locks and/or quiescing I/O operations is important for ensuring that no erroneous I/O operations are performed.

At this point, if one or more of the earlier described flags are set, certain kernel, driver, or volume manager behavior might be affected. For example, if partitioning is to be changed, various processes or programs can be instructed to use whole device information and offset information relative to beginning of the disk, rather than from the beginning of a partition/slice.

Once I/O operations are quiesced and/or held by whatever technique is desired, the resize operation is performed at 435. FIG. 6 illustrates an example of the operations performed during the actual resize operation. After being invoked (600), various parameters associated with the VM disk and/or the expandable storage device are updated (610). This operation can include saving user supplied parameters. Additionally, the relevant VM disk format and OS platform are selected in 620 and 630. The selection process can be as simple as calling format-specific and/or platform-specific routines to perform the actual resize operations. In another example, format and platform selection can be achieved by setting flags and having various resize routines perform differently depending on the flag values. Next the information about the original LUN geometry, i.e., before the storage device was expanded, is obtained (640). This process can involve accessing data stored in data structures from earlier steps in the process, reading various device or storage virtualization records, and/ or issuing one or more commands to the storage device to obtain this information (assuming it is still available from the storage device). As noted above, the geometry information can be derived from a variety of different sources such as volume manager records, partition records, and the like. Similarly, information about the geometry of the expanded LUN is obtained in 650. Although this process can generally include any of the processes described for obtaining pre-expansion information, the most common method for deriving this information is to issue one or more commands to the storage device, thereby having the device report geometry information directly. In addition to geometry information, a variety of different device attributes (e.g., version information, vendor information, status information, etc.) can also be obtained.

In one example where the expandable storage device is a SCSI device, the systems, methods, apparatus and software of the present invention can make use of the SCSI INQUIRY and MODE SENSE commands. However, systems, methods, apparatus and software of the present invention need not be limited to SCSI commands. Any device command structure providing similar functionality can be used, and SCSI INQUIRY and MODE SENSE commands are only one example. The SCSI standard describes various SCSI devices, and the hardware/software entities supporting SCSI functionality using several specific terms. For example, a SCSI target device contains logical units and target ports (sometimes referred to as targets), and receives device service and task management requests for processing. A logical unit is an externally addressable entity within a target that implements a SCSI device model and contains a device server. A device server is an object within a logical unit that executes SCSI tasks according to the rules of task management. The INQUIRY command requests that information regarding parameters of the target and a component logical unit be sent to the application client. Options allow the application client to request additional information about the target and logical unit or information about SCSI commands supported by the device server. The MODE SENSE commands provide a means for a device server to report parameters to an application client. These commands are complementary to the MODE SELECT commands. The MODE SELECT commands provide a means for an application client to specify medium, logical unit, or peripheral device parameters to the device server. SCSI commands are described in *SCSI Primary Commands*-3 (SPC-3), Working Draft, Revision 03, T10, a Technical Committee of the Accredited Standards Committee of the National Committee for Information Technology Standards (NCITS), 10 Jan. 2002, which is hereby incorporated by reference herein in its entirety.

With pre-expansion and post-expansion information available, the virtual device mapping changes can be determined (660). This step can include a variety of tasks such as calculation of new offset values; calculating new length values; computing required alignments; calculating partition changes; updating private region information; creating new subdisks corresponding to newly available storage; revising subdisk information; etc. In general, this step can include any type calculation or determination necessary or useful to provide updated virtual storage device mapping information so that existing data is preserved and so that changes in the expandable storage device are accommodated.

Once the requisite changes are determined, information in a variety of locations is updated accordingly (670). This can include: updates to private region information (e.g., writing a new header record), updates to partition information (e.g., updating a VTOC table), and updating relevant information in the volume manager (e.g., mapping information 231).

Upon completion, operation returns to FIG. 4 and step 440. At this point, a determination is made whether the VM disk resize has caused an overlap among the private and public regions. If there is such an overlap, one solution is to create a special subdisk (445) to represent and protect the portion of the private region encroaching into the public region. Doing so will ensure that the overlap portion is not used for some other subdisk, which would threaten important data stored in the private region. Overlap can occur, for example, where the private region is initially at the end of the disk and the public region is initially at the beginning of the disk, but additional disk space from the expansion is added to the public region. Thus the old layout cannot be kept. In the case that there is an overlap, a number of approaches can be implemented: (1) have one private region and multiple public regions; (2) create multiple private regions if necessary to avoid overlap; (3) move the private region to the new end of the disk; (4) move the private region to the beginning of the disk; and (5) keep the private region as is, and let public region cover the whole disk (including private region), thus allowing overlap. Depending upon the system platform, configuration, layout information, etc., any of the above approaches might be taken by the virtualization software.

If there is no overlap, or subsequent to the creation of the special subdisk, various clients of the VM disk are notified in some manner that there has been a change to the VM disk and/or to the corresponding storage device (450). Such notification might include setting of a flag or passing VM disk or storage device attributes to the clients. In a cluster or distributed environment, changing the information on one host is typically not adequate. The change must usually be propagated to all hosts using an appropriate protocol. Additionally, some of the action may need to be coordinated on all hosts to ensure data integrity. For example, I/O operation suspension/resumption during a mapping change should be across all hosts accessing the device. Such operations would typically require distributing: a unique identifier describing the storage device, new device parameters, and status information. If a system crashes in the middle of such an operation, it is preferable that the system be designed to recover. By setting appropriate flags, for example, the operation could be restarted following a system crash. The process then terminates at 460.

The flow charts of FIGS. 3-6 illustrate some of the many operational examples of the virtual storage device resizing disclosed in the present application. Those having ordinary skill in the art will readily recognize that certain steps or operations illustrated in FIGS. 3-6 can be eliminated or taken in an alternate order. Moreover, the methods described in FIGS. 3-6 and many of the modules illustrated in FIG. 2 are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources. The storage virtualization software can operate in whole or in part on host computer systems such as those illustrated in FIGS. 1 and 2, and/or it can operate in whole or in part in storage appliances, switches, distributed virtualization environments (e.g., where certain virtualization tasks are performed by different devices), and the like.

To take complete advantage of newly available storage (in the case where storage is added to the expandable storage device) a number of additional steps (not shown) might be performed. For example, the one or more volumes defined using the subdisk or subdisks affected by the change might have to be reconfigured. Additionally, other elements of the virtualization scheme such as RAID implementations, mirroring, snapshoting, volume resynchronization, etc., may be impacted by the change in the expandable storage device.

Further variations in the resize process might depend on whether storage is added to or removed from the expandable storage device. In the case where storage is added, specific techniques for using the new space are typically implemented. For example, most or all of the additional storage space can be added to the end of the existing public region. Increases and decreases in the available storage may only be affected at certain locations in the VM disk, e.g., only at the end of the public region as opposed to anywhere in the public region. Moreover, resize operations to accommodate a decrease in available storage from the expandable storage device may have to determine what to do with subdisks or other virtual storage objects that are partially or completely outside the new usable area. For example, if a user configuration is redundant, the data to be dropped can be relocated to alternate locations by setting appropriate flags. In still other examples, particularly in cases where available storage decreases, the VM disk resize operation can be performed before there is an actual change in the expandable storage device.

As described above, there are generally two aspects to accommodating storage expansions: (1) operating system specific changes (e.g., partitioning, VTOC updates, disk label changes, etc.); and (2) storage virtualization specific changes (e.g., private regions, header records, etc.). In some embodiments, it is possible that the distinction between the two is blurred. For example, a particular operating system may also implement the storage virtualization scheme. However, many of the embodiments described herein distinguish between the two aspects of expansion accommodation, and it is still quite useful to examine theses two aspects separately.

Because of the distinctive functions performed by the operating system and the virtualization software, coordinating the entire process can pose certain challenges. For example, some of the operations that are typically performed during a resize operation are: changing device partitioning and VTOC if applicable; updating cached information in operating system drivers; changing any other data store on the disk (e.g., OS or virtualization specific labels; relocating a private region if necessary; changing a disk header describing the disk parameters; and changing a disk group configuration. Some of these operations are operating system related operations, while others are virtualization software related. Moreover, many (if not all) of these operations cannot be performed atomically, so proper sequencing of operations can be very important.

For example, if the change in device geometry associated with storage device expansion is such that the partition/slice corresponding to the public region does not start where it used to, the VTOC cannot be changed without updating the diskgroup configuration to adjust the offsets. However the two tasks typically cannot be performed together atomically. Thus in one embodiment, the manner in which blocks are addressed is switched to use absolute (from beginning of disk) offset information. Now the VTOC can be changed, then the diskgroup configuration can be updated, and finally block addressing can revert back to use the original partition/slice and offset corresponding to it.

Device drivers can pose additional problems. In most operating systems, the device drivers do not update their view of a storage device's size or layout as long as the device is open. Even if device partitioning is changed, the change is not usually effective until the device is closed and reopened. Moreover, the open/close semantics vary from one operating system to another for regular and layered open operations. Consequently, appropriate action must be taken to ensure that a device is closed and reopened while also maintaining the proper corresponding open/close reference count.

In another example, label data is sometimes stored at the beginning as well as end of a disk. However, the new end of the disk, i.e., resulting from expansion, is usually not accessible until device drivers update their cached information. Thus, the updating of label information is typically deferred until repartitioning has been performed and a close/reopen cycle has taken place. Similarly, if the private region of a VM disk is to be moved to the end of the disk, the move operation should be performed after the disk has been repartitioned. Unfortunately, if a system crash occurs after the partition table has been updated, a reboot would cause the system to look for the private region at end of the disk, even though it has not yet been relocated. To avoid this situation in one embodiment, an initial repartitioning operation keeps the private region in place and changes the device label to reflect the fact that the disk is bigger. Next, a private region is setup at the end of the disk. Then, another repartitioning is performed to reflect that the slice/partition corresponding to the private region is at end of the disk. In still another variation where there has been a disk alignment change, it may not be possible to keep the private region in place. Under such circumstances, the public and private regions can be allowed to overlap, or a "fake" geometry (e.g., cylinder size) can be established that would allow the private region to remain in place (temporarily) but still have the effect of making the disk larger. Once the private region has been setup at the new end of disk, repartitioning can be performed.

In some operating systems, a device may be marked unusable if the device geometry does not match the VTOC or master boot record. Typically, the operating system provides an interface to repartition the device in such cases, but data could still be lost if the repartition operation was performed without knowledge of the previous partitioning scheme. In such cases, heuristics based on VM disk header information can be used to restore the partitioning or to create new partitions as appropriate.

Performing operations such as moving the private region while the device is online, can require careful coordination among various software entities like a virtualization configuration daemon and the drivers associated with virtualization software. For example, if a configuration daemon might first setup a new private region for use and then pass information about this private region to a driver or driver module. The driver or driver module would then quiesce I/O operations, copy relevant data from the old private region to the new private region, and then start using the new private region. The old private region can now be removed. Proper flags, for example, can be used to ensure that data from the new region is used if a system crash occurs before the old private region has been deleted.

In still other embodiments, certain operations should be performed transactionally, that is either completely or not at all. Since the operations are performed online, often they have to be coordinated with I/O access. One way to accomplish this is to implement each subtask as an ioctl (Unix/Linux), or some other appropriate OS level device access command, and then pack information about all these subtasks in a composite data structure and issue a single ioctl to the driver. The driver would perform these one after another in the order specified as long as they all succeed. In case of failure, a rollback mechanism can be specified as part of the composite structure passed. This technique would be used by the driver to undo any changes if there is a failure.

FIG. 7 illustrates a block diagram of a computer system 700 for implementing the techniques for handling expandable storage of the present invention. For example, computer system 700 can be an embodiment of one of the previously described hosts. Computer system 700 includes a processor 710 and a memory 720 coupled together by communications bus 705. Processor 710 can be a single processor or a number of individual processors working together. Memory 720 is typically random access memory (RAM), or some other dynamic storage device, and is capable of storing instructions to be executed by the processor, e.g., volume manager 230 and its components. Memory 720 is also used for storing temporary variables or other intermediate information during the execution of instructions by the processor 710.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 230 can be provided to the computer system via a variety of computer readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Computer system 700 also includes devices such as keyboard & mouse 750, SCSI interface 752, network interface 754, graphics & display 756, hard disk 758, and CD-ROM 760, all of which are coupled to processor 710 by communications bus 707. It will be apparent to those having ordinary skill in the art that computer system 700 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
receiving information describing storage expansion in an expandable storage device;
determining changes to be made to information for converting input/output (I/O) operations directed at a virtual storage device to I/O operations directed at the expandable storage device, wherein
the determining changes is based at least in part on the information describing storage expansion in an expandable storage device,
the determining changes comprises
determining layout information for the expandable storage device, and
the layout information comprises at least one of
a sector alignment of the expandable storage device, or
a cylinder alignment of the expandable storage device;
quiescing all I/O operations directed at the virtual storage device;
after the quiescing, applying the changes to be made to the information for converting I/O operations directed at a virtual storage device to I/O operations directed at the expandable storage device; and
after the applying the changes, resuming the quiesced I/O operations.

2. The method of claim 1 further comprising:
preventing at least one I/O operation from being directed to the expandable storage device; and
allowing the at least one I/O operation to be directed to the expandable storage device subsequent to the applying the changes.

3. The method of claim 1 further comprising:
sending at least one I/O interface command included in a standardized I/O protocol to the expandable storage device.

4. The method of claim 1 wherein the expandable storage device further comprises a disk array.

5. The method of claim 4 wherein the disk array includes at least one small computer system interface (SCSI) logical unit having a logical unit number (LUN).

6. The method of claim 1 wherein the virtual storage device further comprises at least one of a volume, a subdisk, and a plex.

7. The method of claim 1 further comprising:
informing at least one client of the expandable storage device about the changes to be made to the information for converting I/O operations directed at a virtual storage device to I/O operations directed at the expandable storage device.

8. The method of claim 1 further comprising:
changing a configuration of the virtual storage device based on the storage expansion in the expandable storage device.

9. The method of claim 1 further comprising:
allowing I/O operations to be directed at the virtual storage device during the applying the changes to be made to the information for converting I/O operations directed at the virtual storage device to I/O operations directed at the expandable storage device.

10. The method of claim 1 further comprising:
receiving information describing a state prior to the storage expansion of the expandable storage device, wherein the determining changes is based at least in part on the information describing a state prior to the storage expansion of the expandable storage device.

11. The method of claim 1 further comprising:
    updating a partition record on the expandable storage device.

12. The method of claim 1 wherein the determining changes further comprises at least one of:
    calculating an offset of a public region of the virtual storage device;
    calculating an offset of a private region of the virtual storage device;
    calculating a length of at least one of a partition, a public region, a private region, and the virtual storage device; and
    determining whether a virtual storage device is affected by storage expansion in the expandable storage device.

13. The method of claim 1 wherein the information describing storage expansion in the expandable storage device comprises at least one of:
    cylinder information;
    head information;
    sector information;
    partition information;
    an amount of storage available in the expandable storage device;
    an expandable storage device identifier; and
    expandable storage device layout information.

14. The method of claim 1 encoded in a computer readable medium as instructions executable on a processor, the computer readable medium being one of an electronic storage medium, a magnetic storage medium, an optical storage medium, and a communications medium conveying signals encoding the instructions.

15. A system comprising:
    a virtual storage device manager configured to map input/output (I/O) operations targeting a virtual storage device to I/O operations targeting an expandable storage device, the virtual storage device manager including storage device mapping information; and
    an online storage device resize module in communication with the virtual storage device manager, wherein the online storage device resize module comprises at least one processor configured to:
        receive information describing storage expansion in the expandable storage device;
        determine changes to be made to the storage device mapping information, wherein
            the changes are based at least in part on the information describing storage expansion in the expandable storage device,
            the changes are based at least in part on layout information for the expandable storage device, and
            the layout information comprises at least one of a sector alignment of the expandable storage device or a cylinder alignment of the expandable storage device;
        quiesce all I/O operations targeting the virtual storage device;
        after all I/O operations targeting the virtual storage device have been quiesced, update the storage device mapping information while the expandable storage device is online; and
        after the storage device mapping information is updated, resume the quiesced I/O operations.

16. The system of claim 15 further comprising:
    a kernel module in communication with the virtual storage device manager and the online storage device resize module, wherein the kernel module is configured to:
        suspend I/O operations targeting the expandable storage device when instructed to do so by the online storage device resize module; and
        resume I/O operations targeting the expandable storage device when instructed to do so by the online storage device resize module.

17. The system of claim 15 further comprising:
    a memory coupled to the processor, wherein at least a portion of at least one of the virtual storage device manager and the online storage device resize module is encoded as instructions stored in the memory and executable on the processor.

18. The system of claim 17 further comprising:
    a disk array, wherein the disk array is the expandable storage device.

19. The system of claim 18 wherein the disk array includes at least one small computer system interface (SCSI) logical unit having a logical unit number (LUN).

20. The system of claim 15 wherein the online storage device resize module is further configured to send at least one I/O interface command included in a standardized I/O protocol to the expandable storage device.

21. The system of claim 15 wherein the virtual storage device further comprises at least one of a volume, a subdisk, and a plex.

22. The system of claim 15 wherein the online storage device resize module is further configured to change a configuration of the virtual storage device based on the storage expansion in the expandable storage device.

23. The system of claim 15 wherein the online storage device resize module is further configured to perform at least one of:
    determine expandable storage device layout information that provides at least one of sector alignment and cylinder alignment;
    calculate an offset of at least one of a partition, a public region, a private region, and the virtual storage device;
    calculate a length of at least one of a partition, a public region, a private region, and the virtual storage device; and
    determine whether a virtual storage device is affected by storage expansion in the expandable storage device.

24. The system of claim 15 wherein the information describing storage expansion in the expandable storage device comprises at least one of:
    cylinder information;
    head information;
    sector information;
    partition information;
    an amount of storage available in the expandable storage device;
    an expandable storage device identifier; and
    expandable storage device layout information.

25. A computer readable medium comprising program instructions executable on a processor, the computer readable medium being at least one of an electronic storage medium, a magnetic storage medium, or an optical storage medium, wherein the program instructions are executable to implement each of:
    receiving information describing storage expansion in an expandable storage device;
    determining changes to be made to information for converting input/output (I/O) operations directed at a virtual storage device to I/O operations directed at the expandable storage device, wherein the determining changes is based at least in part on the information describing storage expansion in an expandable storage device, the determining changes comprises
    determining layout information for the expandable storage device, and
    the layout information comprises at least one of
        a sector alignment of the expandable storage device, or
        a cylinder alignment of the expandable storage device;

quiescing all I/O operations directed at the virtual storage device;

after the quiescing, applying the changes to be made to the information for converting I/O operations directed at a virtual storage device to I/O operations directed at the expandable storage device; and after the applying the changes, resuming the quiesced I/O operations.

26. The computer readable medium of claim 25 wherein the applying changes occurs at least partially while at least one I/O operation is directed at the virtual storage device.

27. The computer readable medium of claim 25 further comprising program instructions executable to implement:
    preventing the at least one I/O operation from being directed to the expandable storage device during the applying the changes; and
    allowing the at least one I/O operation to be directed to the expandable storage device after the applying the changes.

28. The computer readable medium of claim 25 further comprising program instructions executable to implement:
    sending at least one I/O interface command included in a standardized I/O protocol to the expandable storage device.

29. The computer readable medium of claim 25 wherein the expandable storage device further comprises a disk array.

30. The computer readable medium of claim 25 wherein the virtual storage device further comprises at least one of a volume, a subdisk, and a plex.

31. The computer readable medium of claim 25 further comprising program instructions executable to implement:
    informing at least one client of the expandable storage device about the changes to be made to the information for converting I/O operations directed at a virtual storage device to I/O operations directed at the expandable storage device.

32. The computer readable medium of claim 25 further comprising program instructions executable to implement:
    changing a configuration of the virtual storage device based on the storage expansion in the expandable storage device.

33. The computer readable medium of claim 25 further comprising program instructions executable to implement:
    updating a partition record on the expandable storage device.

34. The computer readable medium of claim 25 wherein the information describing storage expansion in the expandable storage device comprises at least one of:
    cylinder information;
    head information;
    sector information;
    partition information;
    an amount of storage available in the expandable storage device;
    an expandable storage device identifier; and
    expandable storage device layout information.

35. A computer readable medium comprising program instructions executable on a processor, the computer readable medium being at least one of an electronic storage medium, a magnetic storage medium, or an optical storage medium, wherein the program instructions are executable to implement each of:
    receiving information describing storage expansion in an expandable storage device;
    determining expandable storage device layout information that provides at least one of sector alignment and cylinder alignment;
    calculating an offset of at least one of a partition, a public region, a private region, and the virtual storage device;
    calculating a length of at least one of a partition, a public region, a private region, and the virtual storage device;
    determining whether a virtual storage device is affected by storage expansion in the expandable storage device;
    determining changes to be made to information for converting input/output (I/O) operations directed at a virtual storage device to I/O operations directed at the expandable storage device, wherein
        the determining changes is based at least in part on the information describing storage expansion in an expandable storage device;
    applying the changes to be made to the information for converting I/O operations directed at a virtual storage device to I/O operations directed at the expandable storage device.

36. An apparatus comprising:
    a means for receiving information describing storage expansion in an expandable storage device;
    a means for determining changes to be made to information for converting input/output (I/O) operations directed at a virtual storage device to I/O operations directed at the expandable storage device, wherein
        the determining changes is based at least in part on the information describing storage expansion in an expandable storage device,
        the determining changes comprises
            determining layout information for the expandable storage device, and
            the layout information comprises at least one of
                a sector alignment of the expandable storage device, or
                a cylinder alignment of the expandable storage device;
    a means for quiescing all I/O operations directed at the virtual storage device, the means for quiescing comprising a means for preventing at least one I/O operation from being directed to the expandable storage device;
    a processor configured to, after all I/O operations targeting the virtual storage device have been quiesced, apply the changes to be made to the information for converting I/O operations directed at a virtual storage device to I/O operations directed at the expandable storage device;
    a means for, after the changes have been applied, resuming the quiesced I/O operations; and
    a means for allowing the at least one I/O operation to be directed to the expandable storage device.

37. The apparatus of claim 36 further comprising:
a means for informing at least one client of the expandable storage device about the changes to be made to the information for converting I/O operations directed at a virtual storage device to I/O operations directed at the expandable storage device.

38. The apparatus of claim 36 further comprising:
a means for changing a configuration of the virtual storage device based on the storage expansion in the expandable storage device.

39. The apparatus of claim 36 further comprising:
a means for allowing I/O operations to be directed at the virtual storage device during the applying the changes to be made to the information for converting I/O operations directed at a virtual storage device to I/O operations directed at the expandable storage device.

* * * * *